United States Patent [19]

Kato

[11] 3,937,422
[45] Feb. 10, 1976

[54] MAGNETIC TAPE RECORDING AND REPRODUCING MACHINES

[75] Inventor: Tomomi Kato, Tokyo, Japan

[73] Assignee: Sansui Electric Co., Ltd., Tokyo, Japan

[22] Filed: Nov. 30, 1973

[21] Appl. No.: 420,518

[30] Foreign Application Priority Data

Dec. 1, 1972  Japan .................... 47-137576[U]

[52] U.S. Cl. ............... 242/204; 242/75.4; 242/210
[51] Int. Cl.² .................. G11B 15/22; B65H 25/32
[58] Field of Search .......... 242/204, 203, 202, 208, 242/209, 201, 54.1 R, 75.4, 75.44, 210, 198, 199, 200

[56] References Cited
UNITED STATES PATENTS

| 2,974,891 | 3/1961 | Waldhauer | 242/203 |
| 3,545,766 | 12/1970 | Osborn | 242/204 |

FOREIGN PATENTS OR APPLICATIONS

| 1,121,827 | 1/1962 | Germany | 242/204 |

*Primary Examiner*—George F. Mautz
*Attorney, Agent, or Firm*—Carothers and Carothers

[57] ABSTRACT

A brake mechanism in a magnetic tape recording and reproducing machine in which a magnetic tape is transported from one reel to the other reel comprising brake drums corresponding to two reels, brake shoes, means for securing the brake shoes and means for pressing the brake shoes to respective brake drums. Two micro-switches are provided for detecting the displacement of the respective means for securing the brake shoes in the direction of the rotation of the respective brake drums caused by the friction between the brake shoes and the brake drums in the operation of the brake mechanism.

The two micro-switches are used for controlling a circuit giving D.C. current to stator windings of two electric motors for driving respective reels so that the rotors of both motors may be subjected to electromagnetical braking. The two micro-switches are also used for prohibiting the machine from starting until the tape transportation is perfectly stopped after operation of the brake mechanism.

7 Claims, 7 Drawing Figures

MAGNETIC TAPE RECORDING AND REPRODUCING MACHINES

BACKGROUND OF THE INVENTION

This invention relates to magnetic tape recording and reproducing machines, and, more particularly, to braking in such machines.

As is well known, a magnetic tape recording and reproducing machine comprises a rotating supply shaft for carrying a supply reel thereon, a rotating take-up shaft for carrying a take-up reel thereon, means for rotating the supply and take-up shafts, a magnetic head assembly for writing and reading information signals on and from a magnetic tape passing thereon, information input and output circuit means, means for maintaining the tape transporting speed constant and braking means to stop the rotation of the rotating supply and take-up shafts when the tape transporting is desired to be stopped.

A known braking mechanism is, a so called block brake mechanism, which comprises a brake drum carried on each rotating shaft for carrying a reel and a friction block which is pressed onto a peripheral surface of the brake drum upon braking.

There is known, a so called band brake mechanism which comprises a brake drum carried on each rotating shaft for carrying a reel and a band around the drum which binds the drum upon braking.

Another known brake system is an electromagnetic brake system, wherein D.C. current is supplied to the stator windings of the electric motor means for driving the supply and take-up reels.

In the play mode, tape transporting is stopped instantaneously when the brake mechanism is operated, because the tape transporting speed is slow. But when the machine is used in the rewinding mode or in the fact winding mode, it takes a time until the tape transporting stops after the brake mechanism is operated. It is very desirable to reduce the time from the operation of the brake mechanism to the stop of the tape. This stop time has been sufficiently reduced in the above mentioned known brake mechanisms for smaller reels, but has not yet been sufficient for larger reels.

In known magnetic tape recording and reproducing machines, the operator can start the machine or stop it arbitrarily. If he starts the machine in the play mode before stopping of the tape transporting has been effected after operating the brake mechanism to stop its rewinding, the tape may be broken. Accordingly, it is preferable to prohibit the machine from starting instantaneously after operating the same for stopping and until a complete stop of the tape has been achieved.

OBJECTS OF THE INVENTION

An object of the present invention is to provide a braking system for a magnetic tape recording and reproducing machine which is provided with means for detecting the time lapse from the initial operation of the brake mechanism to a completed stop of the tape transportation and a direction of the tape transportation in the braking operation.

Another object of the invention is to provide magnetic tape recording and reproducing machines wherein the required time elapsed from the initial operation of the brake mechanism to the complete stop of the tape transportation is sufficiently reduced.

Still another object of the invention is to provide magnetic tape recording and reproducing machines which have means for prohibiting restarting of the machine after operation for stopping the machine until a complete stop of the tape transportation has been accomplished.

The other objects and features of this invention will be clearly understood from following descriptions in connection with embodiments of this invention in reference to the annexed drawings.

DETAILED EXPLANATION OF PREFERRED EMBODIMENTS

Figure 1:
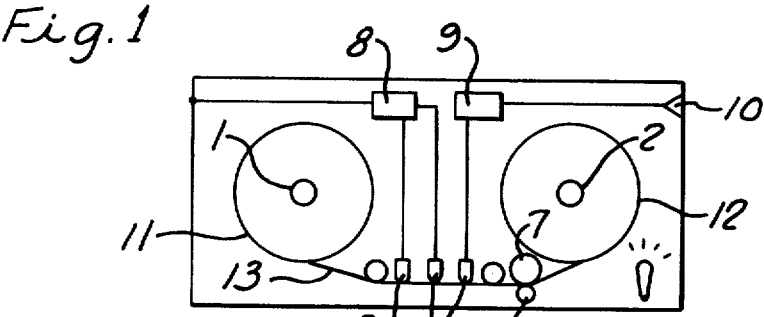
FIG. 1 shows a diagrammatic plan view of a magnetic tape recording and reproducing machine.

Referring to FIG. 1, the magnetic tape recording and reproducing machine illustrated comprises a rotating supply shaft 1, a rotating take up shaft 2, an erazing head 3, a write head 4, a read head 5, a capstan roller 6, a pinch roller 7, recording circuit 8, reproducing circuit 9, and a speaker 10.

A supply reel 11 and a take-up reel 12 are carried on the rotating supply shaft 1 and on the rotating take-up shaft 2, respectively and they are rotated together with their respective shafts. The tape 13 is transported between the reels. In the recording or reproducing mode, the tape transporting speed is maintained constant under the control of the capstan roller 6 and the pinch roller 7, and the tape engages with heads 3, 4 and 5 so that the functions of information recording or reproducing may be performed.

Because magnetic tape recording and reproducing machines are well known in the prior art in their structure and operation, further descriptions are not necessary and are omitted for the simplicity of the description.

An important feature in magnetic tape recording and reproducing machine is a braking system.

When the transportation of the tape is stopped, it is required that neither great tape tension or tape slack result. Therefore the braking system is so arranged that the braking strength on a shaft on a side of the reel from which a tape is being drawn out is greater than that on the other shaft on the other side of the other reel to which the tape is rolled up on.

Figure 2:
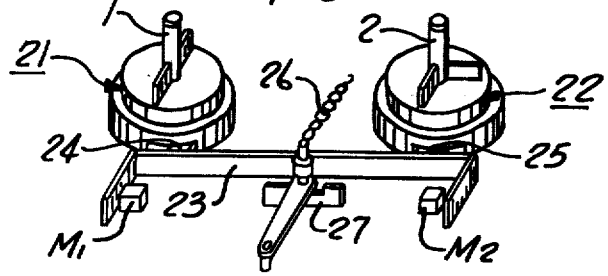
FIG. 2 shows a perspective view of an embodiment in which this invention is applied to a known brake mechanism of the block brake type for magnetic tape recording and reproducing machines.

FIG. 2 shows a known braking system of the block brake type, which comprises two brake drums 21 and 22, which are carried on and fixed to rotating shafts 1 and 2 respectively, a bar 23 disposed in parallel with a plane containing the axes of shafts 1 and 2, opposite end portions of which respectively face peripheral surfaces of drums 21 and 22, two block brake shoes 24 and 25 fixed to respective end portions of the bar 23, a spring means 26 to press the shoes 24 and 25 against the peripheral surfaces of the brake drums 21 and 22, and a limiter means 27 for limiting the motion of the bar 23 to a predetermined extent in the direction of the length of the bar.

In the braking system of FIG. 2, the braking strength on a shaft 1 on the supply side where reel 11 is located and from which a tape is drawn out is greater than that on the other shaft 2 on the other or take-up side where the other reel 12 on which the tape is rolled up, because the shoes 24 and 25 are moved together with the bar 23 in the direction of brake drum rotation (toward the right in FIG. 2), so that one shoe 24 serves to cut into the surface of drum 21 to thereby develop greater braking strength than the other shoe 25.

Figure 3:
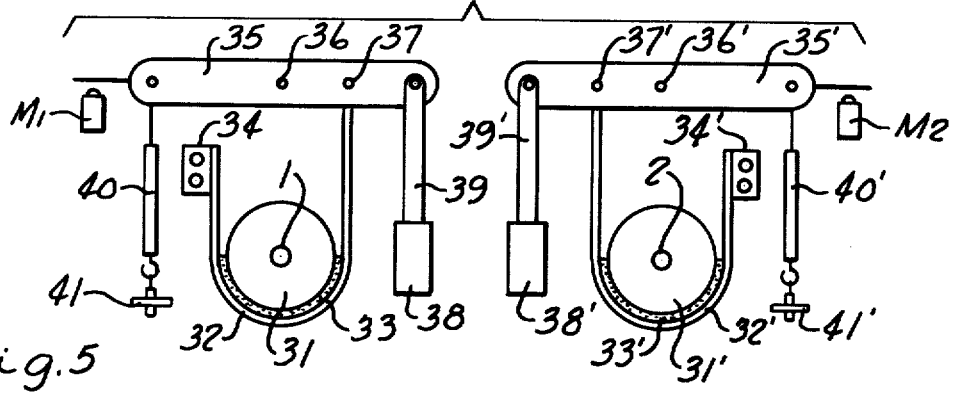
FIG. 3 shows a plan view of another embodiment in which this invention is applied to another known brake mechanism of the band brake type.

FIG. 3 shows another known braking system, which comprises two brake drums 31 and 31' secured to and carried on rotating shafts 1 and 2 respectively, two brake bands 32 and 32' respectively disposed around brake drums 31 and 31', two band shoes 33 and 33' fixed to respective brake bands 32 and 32' and respectively facing peripheral surfaces of brake drums 31 and 31', fixtures 34 and 34' fixing one end of the respective brake bands 32 and 32', levers 35 and 35' pivotally supported at points 36 and 36', pivot means 37, 37'λ connecting the other ends of brake bands 32 and 32' to respective levers 35 and 35', solenoids 38 and 38' having plungers 39 and 39' connected to one end of levers 35 and 35' respectively, and spring means 40 and 40' connected to the other ends of levers 35.

Spring means 40 and 40' are each fixed at one end to fixture means 41 and 41'.

As can be clearly understood from FIG. 3, pivot means 37 and 37' are between supporting points 36 and 36' and one end of levers 35 and 35' connected to plungers 39 and 39', and the arrangement of parts are symmetrical as between the supply side and the take-up side.

When solenoids 38 and 38' are not energized, levers 35 and 35' are turned about supporting points 36 and 36' by spring means 40 and 40' to draw brake bands 32 and 32' so that band shoes 33 and 33' may be pressed on the peripheral surfaces of brake drums 31 and 31'. Thus the rotation of drums 31 and 31' is stopped.

When the drum 31 rotates in the counterclockwise direction (in FIG. 3) or the tape is being drawn from the supply reel, brake shoe 33 and brake band 32 are displaced in the counterclockwise direciton by the friction between the shoe 33 and the drum 31 when energization of solenoid 38 is broken, so that the drum 31 may be more strongly bound by the shoe 33. Accordingly, in the brake system in FIG. 3, the braking stength on a shaft 1 on the side of the machine from which tape is drawn is greater than that on the other shaft 2 on the other side where the other reel is located and upon which the tape is rolled.

In the known braking systems as above described in connection with FIGS. 2 and 3, the time elapsed from the press of the shoe to the brake drum to the stop of the tape transportation is not constant, but increases with the use of the greater reels or larger amount of tape rolled on the reels and with higher speeds of tape transportation.

But it is desired that the tape transportation may be stopped in the shortest possible time after the operation of the brake mechanism. It is also desired that the restart of the machine is prohibited until the tape transportation is completely stopped, because, if the operator may start the machine before the tape transportation is perfectly stopped, the tape may be subjected to abnormally high tension thereby subjecting it to breakage.

The apparatus of this invention obtains information signal concerning the time at which the operation of the brake system takes place to the time the tape transportation stops and the direction of the tape transportation, to actuate by the signal another braking system such as an electromagnetic brake to reduce the stop time required to completely stop the tape transportation, and, furthermore, to actuate by the signal, means to suppress starting of the machine.

To this end, two micro-switches $M_1$ and $M_2$ are used together with a known brake mechanism.

In FIG. 2, micro-switches $M_1$, $M_2$ are provided and according to this invention, to detect the displacement of the bar 23 in its longitudinal direction.

As predescribed, the bar 23 is displaced, for example, to the right (in FIG. 2) when the tape transportation from the left reel (or supply reel) to the right reel (or take-up reel) is intended to be stopped, so that the micro-switch $M_1$ is switched on, with the other micro-switch $M_2$ being maintained in the off condition. When the tape transportation is perfectly stopped, the bar 23 is returned by the tension of the spring 26 in its longitudinal direction so that the micro-switch $M_1$ is switched off.

In case the direction of the tape transportation is in the reverse, the micro-switch $M_2$ is operated by the bar 23 with the micro-switch $M_1$ being maintained off.

Thus, the information concerning the direction of the tape transportation can be electrically obtained by the operative status of the two micro-switches $M_1$ and $M_2$, and the time elapsed from the operation of the brake mechanism to the stop of the tape transporting can be obtained as the time when either of the two micro-switches $M_1$ and $M_2$ is maintained on.

This invention can also be applied on the known band brake system predescribed in connection with FIG. 3. Two micro-switches $M_1$ and $M_2$ are arranged so that they may detect the excess of the rotational displacement of the respective levers in the direction which permits the respective brake bands to bind the respective brake drums, as shown in FIG. 3.

As predescribed, the excess rotational displacement of the lever 35 results from the friction between the brake drum 31 and the brake shoe 33 when the tape transporting from the left reel (or supply reel) to the right reel (or take-up reel) is intended to be stopped, so that the micro-switch $M_1$ is switched on. The other lever 35', then, is not subjected to the excess rotational displacement, so that the micro-switch $M_2$ is maintained off. When the tape transportation is stopped, excess rotational displacement of the lever 35 is released and, therefore, the micro-switch $M_1$ is switched off.

In case the tape is transported in the reverse direction, the micro-switch $M_2$ is switched on upon initial operation of the braking system.

Accordingly, the information concerning the direction of tape transportation and the time elapsed from the operation of the brake mechanism to the complete stop of the tape transportation can be obtained from the operative status of the two micro-switches.

Figure 4B:
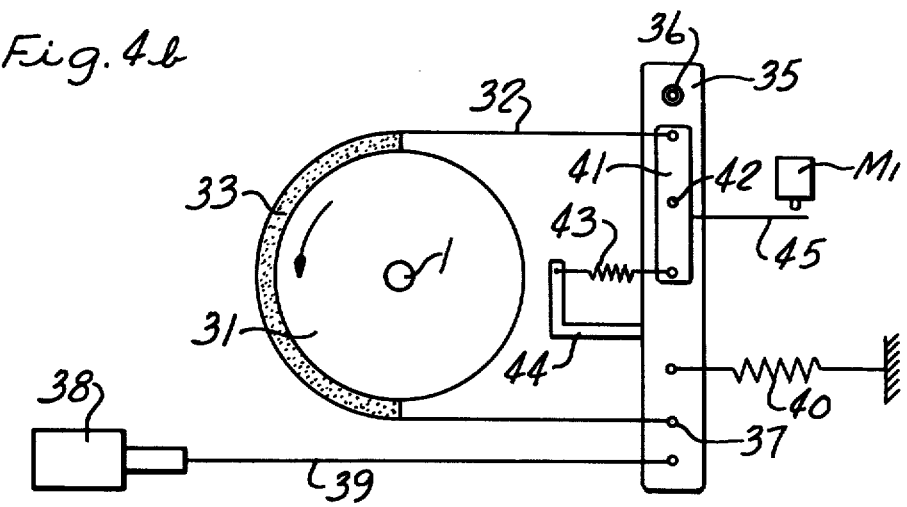
FIGS. 4A–4C show sequence operational plan views of one embodiment of the present invention for explaining the operation of different embodiments of this invention.
Figure 4A:
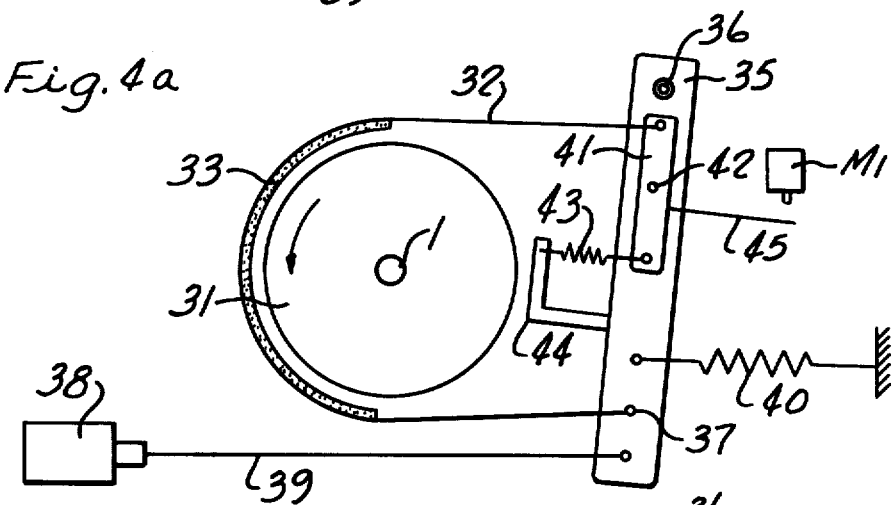
Figure 4C:
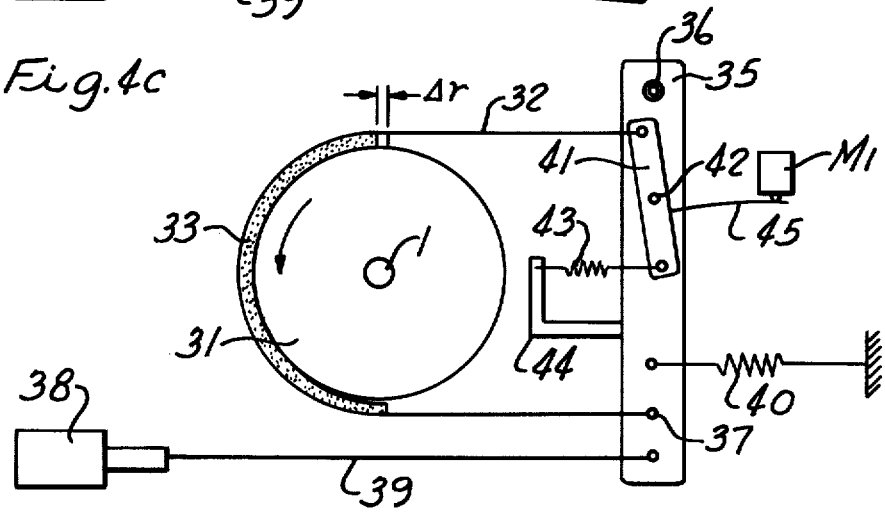

FIGS. 4A–4C show views for explaining the operation of another embodiment. In the drawings, the brake mechanism for one of two spaced rotating shafts is not shown for simplification and because the brake mechanism of the other shaft may be arranged similarly or opposite but symmetrically. And similar parts as in FIG. 3 are indicated by the same reference.

The lever 35 is pivotally supported at one end portion at a point 36 and connected to the plunger 39 at the other end portion. The plunger 39 and the associated solenoid 38 are arranged so that the energization of the solenoid 38 may cause the lever 35 to turn on the support point 36 towards the brake drum 31. The tension spring 40 is connected to the lever 35 so that it causes rotation of the lever 35 on the support point 36 in the direction of rotation of the brake drum 31. An additional lever 41 is pivotally supported at its center position on a pin 42 fixed on the lever 35 at a point near the support point 36. The additional lever 41 is connected to an additional tension spring 43 at its one end portion opposite to the support point 36 in reference to the pin 42, and the spring 43 is fixed to the fixture 44 secured to the lever 35. An arm 45 is secured on the lever 41 at a position between the center position and the one end portion connected with the tension spring 43 and, extends therefrom in the lateral direction. A micro-switch $M_1$ is so arranged that it may engage with and be switched on by the arm 45 when the lever 41 rotates against the tension of the additional spring 43.

The brake band 32 extends around the circumference of the brake drum 31, one end of which is connected to the end of the additional lever 41 opposite to the other end connected to the additional spring, with the other end of the band 32 connected to the end portion of the lever 35, as shown by 37, which is opposite to the support point 36.

Referring to FIG. 4B, the status of brake is shown as not in operation, or the solenoid 38 is energized, and the brake drum 31 is rotating counterclockwise as illustrated by the arrow.

Upon operation of brake system, energizing of the solenoid 38 is released to permit the lever 35 to turn counterclockwise on the support point 36 by the tension of the spring. So that the brake shoe 33 is pressed to the peripheral surface of the brake drum 31, which is, therefore, braked, as shown in FIG. 4B. Then the brake band 2 is displaced counterclockwise by small displacement $\Delta \gamma$ caused by the friction between the brake drum 31 and the brake shoe 33, to cause the additional lever 41 to rotate against the tension of the additional spring 43, as shown in FIG. 4C, so that the micro-switch $M_1$ is switched on by the arm 45.

When the tape transportation is stopped and, therefore the brake drum 31 is stopped, the displacement of the brake band is terminated due to the elimination of the friction between the brake drum 31 and the brake shoe 33 so that the micro-switch $M_1$ is switched off.

In the situation of reverse rotation of the drum 31, the micro-switch $M_1$ is maintained off because the additional lever is not rotated against the tension of spring 43.

Therefore the brake system described in connection with FIGS. 4A–4C provides a function to detect the information concerning the time elapsed from the operation of the brake mechanism to the stop of the tape transportation and the direction of the tape transportation by the operative conditions of the micro-switches.

Figure 5:
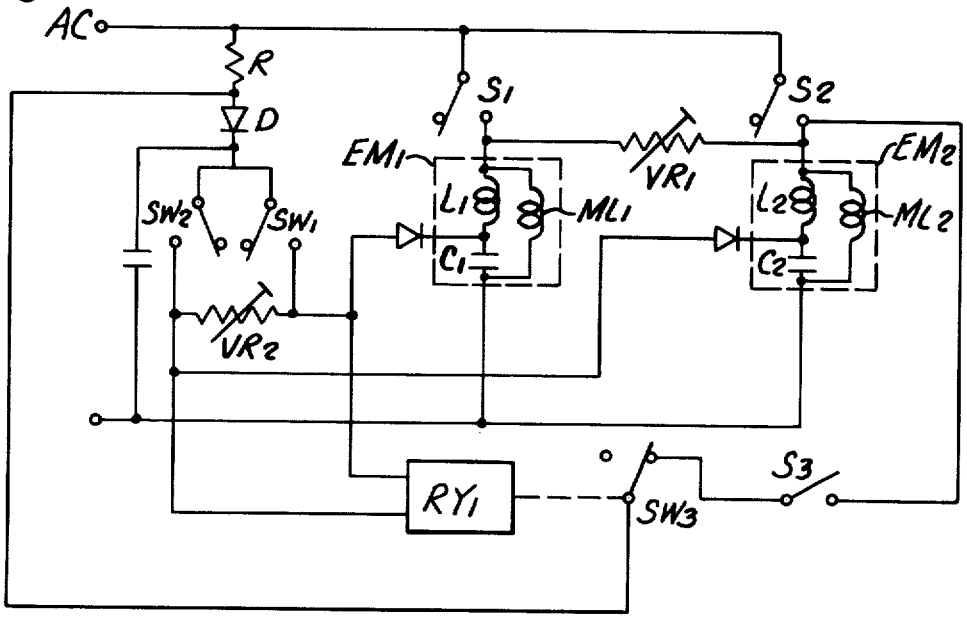
FIG. 5 is a schematic diagram showing an electric circuit of an embodiment used in combination with the brake mechanism illustrated in FIGS. 2, 3 and 4A.

FIG. 5 shows an electric circuit illustrating an embodiment in which micro-switches $M_1$ and $M_2$ are used to control the operation of the additional brake system and means for suppressing the start of the machine in play mode.

An electric motor $EM_1$ is provided for driving the supply reel shaft 1 and is rotated clockwise (viewing the drawing of FIG. 1) when energized. Another electric motor $EM_2$ is for driving the take-up reel shaft 2 and is rotated counterclockwise (viewing the drawing of FIG. 1) when energized. Each electric motor $EM_1$ and $EM_2$ is a condenser motor having a main windings $ML_1$ and $ML_2$, an auxiliary windings $L_2$ and $L_2$ and a capacitor $C_1$ and $C_2$.

When switch $S_1$ is turned on, the electric motor $EM_1$ is rotated with higher torque than the other electric motor $EM_2$, so the tape is rewound to the supply reel (11 in FIG. 1) from the take-up reel (12 in FIG. 1) with the desired tension.

On the other hand, when switch $S_2$ is turned on, the motor $EM_2$ is rotated with higher torque than the motor $EM_1$ so that the tape is rolled up on the take-up reel from the supply reel in the fast mode.

In the play mode, the switch $S_3$ is turned on, and both motors $EM_1$ and $EM_2$ are slowly rotated, the torque of the motor $EM_2$ being greater than that of the other motor $EM_1$ so that the tape is slowly transported from the supply reel to the take-up reel, with a constant speed by the control of the known capstan drive (not shown).

Two switches $SW_1$ and $SW_2$ are operative contacts of the micro-switches $M_1$ and $M_2$, respectively, which are provided for the brake mechanism in accordance with this invention as shown in FIGS. 2, 3 or 4. When the machine is operated from the fast mode to the stop mode, the switch S, is turned off and, at that time, for example, solenoids 38 and 38' (FIG. 3) are released to permit brake shoes 33 and 33' to respectively press brake drums 31 and 31'. Since brake drums 31 and 31' are rotating counterclockwise in FIG. 3 in the fast mode, the micro-switch $M_1$ is turned on, as understood from the predescriptions. Accordingly the switch $SW_1$ (in FIG. 5) is turned on. DC current is supplied to the main windings $ML_1$ and the auxiliary windings $L_1$ of the motor $EM_1$ through the closed switch $SW_1$ and the main windings $ML_2$ and the auxiliary windings $L_2$ of the motor $EM_2$ through the switch $SW_1$ and the variable resistor $VR_2$. Thus rotors (not shown) of both electric motors $EM_1$ and $EM_2$ are suppressed from rotation namely, electromagnetic braking is effected. The D.C. current supplied to the motor $EM_1$ is higher in its level that the other motor $EM_2$. Accordingly the supply reel (11 in FIG. 1) is braked more strongly than the other take-up reel (12 in FIG. 1) so that tape tension may be maintained until the tape transportation is stopped.

When the tape transportation is perfectly stopped, the micro-switch $M_1$ or its switch contact $SW_1$ is turned off as predescribed so that the supply of the DC current to both motors is stopped.

When the machine is stopped while in the rewinding mode such that switch $S_1$ is turned off, the switch contact $SW_2$ of the micro-switch $M_2$ is turned on and the rotors of both electric motors $EM_1$ and $EM_2$ are electromagnetically braked with the rotor of the motor $EM_2$ being braked more strongly than that of the other motor $EM_1$.

When the machine is stopped while in the play mode, the switch $S_3$ is turned off and the other operations are similar to those when which occur when is made in the fast mode.

According to the embodiment of FIG. 5, the electromagnetic brake is provided to stop the reel rotation in addition to the mechanical brake. Therefore the time elapsed from the operation of the brake mechanism to the full stop of the tape transportation is reduced with tape tension being maintained.

In FIG. 5, again, a relay $RY_1$ is connected to the variable resistor $VR_2$. The operating contacts $SW_3$ are connected to the circuit of play switch $S_3$. When the relay $RY_1$ is energized, the contact $SW_3$ is turned off, so that the machine is not started in the play mode even if the switch $S_3$ is operated to be turned on. The relay $RY_1$ is energized when either the switch $SW_1$ or the other switch $SW_2$ is energized. Accordingly, it prohibits the machine to be started in the play mode after the operation of brake mechanism before the stop of the tape transporting.

I claim:

1. A brake mechanism for a rotatable shaft for carrying a tape reel in a magnetic tape recording and reproducing machine comprising AC electric motor means to drive said shaft, mechanical brake means operable to brake said rotatable shaft, DC electric current supply means, switch means adapted to detect displacement of said brake means caused by the braking friction between said brake means and said shaft while said shaft is rotating and thereby feed a DC current from said DC current supply means through the windings of said AC motor means to electromagnetically brake the same.

2. The brake mechanism of claim 1 including second switch means operable in response to the detection by said switch means of displacement to isolate said motor means from its power supply.

3. A magnetic tape recording and reproducing machine comprising a rotatable supply shaft D.C. current supply means for carrying a supply reel, a rotatable take-up shaft for carrying a take-up reel, AC electric motor means for respectively driving said supply and take-up shafts, and brake mechanisms to stop each rotating shaft which each include a brake drum fixed on the respective rotating shaft and a brake shoe positioned for pressing on the peripheral surface of the brake drum, and characterized in that each of said brake mechanisms further consists of support means carrying its respective brake shoe, micro-switch means for detecting displacement of the respective support means caused by the braking friction between the brake shoe and the corresponding brake drum while the corresponding shaft is rotating, said micro-switch means operable to feed a DC electric curent from said DC current supply means to the windings of said AC electric motor means which is in driving engagement with the shaft braked with displacement of said support means to electromagnetically brake said shaft.

4. The magnetic tape recording and reproducing machine of claim 3 including an electromagnetically operated switch operable in response to the actuation of said micro-switch means by displacement of said support means to isolate said AC electric motor means from its electrical power supply.

5. A magnetic tape recording and reproducing machine comprising a rotatable supply shaft for carrying a supply reel, a rotatable take-up shaft for carrying a take-up reel, a supply shaft AC electric motor and a take-up shaft AC electric motor for respectively driving said supply and take-up shafts, a D.C. current supply source and a pair of brake mechanisms to stop each of said rotating shafts respectively which each include said brake drum fixed on the respective rotating shaft and a brake shoe carried by a brake band operable for pressing said brake shoe on the peripheral surface of the brake drum, and characterized in that each of said brake mechanisms further consists of micro-switch means for detecting displacement of the respective brake band caused by the braking friction between the brake shoe and the corresponding brake drum while the corresponding shaft is rotating, said micro-switch means operable to feed a DC electric current from a DC current supply source to the windings of the one of said AC electric motors corresponding to the one of the band brake mechanisms wherein said displacement exists to electromagnetically brake the corresponding shaft.

6. The magnetic tape recording and reproducing machine of claim 5 wherein each of said brake mechanisms further includes a first lever pivotally supported at one end portion, a second lever pivotally supported intermediate its ends on said first lever with one end thereof elastically connected to said first lever, the other end of said second lever connected to one end of said brake band and the other end of said brake band being connected to the other end of said first lever such that braking may be obtained by pivoting said first lever, said micro-switch means being disposed so as to be closed by the pivotal rotation of said second lever caused by said displacement of said band in opposition to said elastic connection.

7. The magnetic tape recording and reproducing machine of claim 5 including an electromagnetically operated switch operable in response to the actuation of either of said micro-switch means by said displacement of said band to isolate both of said AC electric motors from their electrical AC power supply.

* * * * *

UNITED STATES PATENT OFFICE
CERTIFICATE OF CORRECTION

PATENT NO. : 3,937,422
DATED : February 10, 1976
INVENTOR(S) : Tomomi Kato

It is certified that error appears in the above-identified patent and that said Letters Patent are hereby corrected as shown below:

Col. 7, line 35, delete "D.C. current"

line 36, delete "supply means"

line 39, before "and" insert --D.C. current means,-- line 50, erase "curent" and substitute --current--

Col. 8, line 1, after "shaft" insert --being--

Signed and Sealed this

Thirteenth Day of July 1976

[SEAL]

Attest:

RUTH C. MASON
Attesting Officer

C. MARSHALL DANN
Commissioner of Patents and Trademarks